US008184854B2

(12) United States Patent  (10) Patent No.: US 8,184,854 B2
Bartsch  (45) Date of Patent: May 22, 2012

(54) METHOD AND SYSTEM FOR EVALUATION OF THE BEHAVIOR OF USERS OF A DIGITAL IMAGE INFORMATION SYSTEM

(75) Inventor: Ernst Bartsch, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1189 days.

(21) Appl. No.: 11/852,574

(22) Filed: Sep. 10, 2007

(65) Prior Publication Data

US 2008/0069397 A1 Mar. 20, 2008

(30) Foreign Application Priority Data

Sep. 14, 2006 (DE) .......................... 10 2006 043 172

(51) Int. Cl.
*G06K 9/00* (2006.01)
(52) U.S. Cl. ........ 382/103; 382/115; 345/156; 715/700; 715/863
(58) Field of Classification Search .................. 382/154, 382/103, 115, 117; 345/156–158; 715/700, 715/863
See application file for complete search history.

(56) References Cited

U.S. PATENT DOCUMENTS

| | | | | |
|---|---|---|---|---|
| 5,912,721 A * | 6/1999 | Yamaguchi et al. | .......... | 351/210 |
| 7,331,929 B2 * | 2/2008 | Morita et al. | ................. | 600/558 |
| 7,396,129 B2 * | 7/2008 | Endrikhovski et al. | ....... | 351/209 |
| 7,428,744 B1 | 9/2008 | Ritter et al. | | |
| 7,501,995 B2 * | 3/2009 | Morita et al. | ..................... | 345/7 |
| 7,503,653 B2 * | 3/2009 | Endrikhovski et al. | ....... | 351/209 |
| 7,573,439 B2 * | 8/2009 | Lau et al. | ........................... | 345/7 |
| 2002/0049736 A1 * | 4/2002 | Chow | .................. | 707/1 |
| 2002/0105482 A1 * | 8/2002 | Lemelson et al. | ................ | 345/7 |
| 2005/0021369 A1 * | 1/2005 | Cohen et al. | ...................... | 705/2 |
| 2005/0057578 A1 * | 3/2005 | Chen et al. | .................... | 345/630 |
| 2006/0082542 A1 * | 4/2006 | Morita et al. | ................. | 345/156 |
| 2006/0109237 A1 * | 5/2006 | Morita et al. | ................. | 345/156 |
| 2006/0109238 A1 * | 5/2006 | Lau et al. | ...................... | 345/156 |
| 2006/0112334 A1 * | 5/2006 | Endrikhovski et al. | ....... | 715/700 |
| 2006/0256133 A1 * | 11/2006 | Rosenberg | .................... | 345/619 |
| 2007/0078552 A1 * | 4/2007 | Rosenberg | ..................... | 700/94 |
| 2007/0112916 A1 * | 5/2007 | Singh | ........................... | 709/206 |
| 2007/0250385 A1 * | 10/2007 | Young | .............................. | 705/14 |
| 2008/0062382 A1 * | 3/2008 | Endrikhovski et al. | ....... | 351/209 |
| 2008/0062383 A1 * | 3/2008 | Endrikhovski et al. | ....... | 351/209 |
| 2009/0146775 A1 * | 6/2009 | Bonnaud et al. | ............... | 340/3.1 |
| 2010/0306661 A1 * | 12/2010 | Crain et al. | ................... | 715/733 |

FOREIGN PATENT DOCUMENTS

DE 198 01 027 A1 6/1999
EP 1 701 291 A2 9/2006

* cited by examiner

*Primary Examiner* — Aaron W Carter
(74) *Attorney, Agent, or Firm* — Schiff Hardin LLP

(57) ABSTRACT

In a method of evaluation of the user behavior of users of a digital image information system during the viewing and/or assessment and/or processing of at least one image object presented on at least one display device, at least one selectable indicator of the user behavior is recorded (controlled by an electronic control and evaluation device) in the form of recording data by at least one detector during the viewing and/or assessment and/or processing of the image object. The recording data are transferred to the electronic control and evaluation device; and a quantitative and/or qualitative evaluation of the recording data ensues with regard to the image object. A digital image information system is provided that is suitable for implementation of the method.

14 Claims, 2 Drawing Sheets

METHOD AND SYSTEM FOR EVALUATION OF THE BEHAVIOR OF USERS OF A DIGITAL IMAGE INFORMATION SYSTEM

BACKGROUND OF THE INVENTION

1. Field of the Invention

The invention is in the field of digital image information systems and concerns: a method for evaluation of the behavior of users of a digital image information system, a digital image information system suitable for implementation of such a method, a control and evaluation device for such a digital image information system, a computer-readable program code including control commands that cause the control and evaluation device to implement such a method, and a storage medium for the program code.

2. Description of the Prior Art

Medical image information systems are increasingly used in clinics and physicians' practices. "PACS systems" (PACS=Picture Archiving and Communications System), used originally purely for the purpose of image data administration, are now for the most part merged with administratively oriented information systems (such as, for example, radiology information systems (RIS) or hospital information systems (HIS)) into integrated digital image information systems.

In such digital image information systems, apparatuses (what are known as modalities) such as, for example, computed tomography systems, magnetic resonance tomography system, positron emission tomography systems, sonographic systems and angiographic systems generate medical images in the form of pixel data that are sent via a communication network to an image storage and archiving system and are stored there and archived together with administrative text data such as, for example, patient name, birth date, patient number, apparatus number, examination date, study number, etc.

The pixel portions (i.e. the pure image data) of image objects are stored in a typical manner both in a short term storage for the purpose of quick availability and in a long-term data storage for archiving. The short term storage can be fashioned, for example in the form of a RAID storage (RAID=Redundant Array of Independent Disks) in which a number of fixed disks are coupled with one another. Such a storage type enables a fast access to the stored image data, for example within a few seconds. The image data are conventionally erased from the short term storage after the expiration of a specific time span (for example 6 to 12 months). A storage device known as a jukebox can be used for long term data storage, for example. Such a jukebox includes a number of tape storage or magneto-optical or optical discs such as CDs (Compact Discs) or DVDs (Digital Versatile Discs). Due to legal rules it is required that the image data must be retained and presentable for a time span of, for example, 10 to 30 years.

Image objects in a medical image information system are stored in a data format determined by the manufacturers. Since various components of a medical image information system are often produced by various manufacturers, for harmonization of the various data formats an open standard (DICOM=Digital Imaging and Communication) was created in cooperation with the American College of Radiology and the National Electrical Manufacturers Association. This standard establishes (among other things) the structure of the data formats and the descriptive parameters for radiological images, the commands for exchanging these images and the description of other data objects such as image sequences, examination series and findings. According to DICOM an image object includes: a header portion (text data portion) in which is contained administrative information such as patient name, birth date, patient number and the like, and a pixel portion (pixel data) in which is contained the pixel-based image content of the image acquired by an imaging modality.

In clinics and in physicians' practices, the image objects stored in the digital image information system are viewed, assessed and processed at image workstations. In addition to a fast image construction, the ergonomics of the image object presentation plays a very important role in order to support the radiologist or the medical-technical assistant in his or her work. Many practical questions must be clarified in order to satisfy these requirements, for example: Which information is particularly important for the radiologist? In which regions of the image object does the radiologist search particularly frequently? How are image objects viewed in detail? Are there user group-dependent, specific manners of viewing image objects, for example dependent on the country, institution, user training and user inspection? How many computer mouse clicks and/or keyboard strikes are necessary until a specific result is achieved, for example until a physicians report is dictated?

Such questions have conventionally been discussed in personal interviews with radiologists and medical-technical assistants and in this way it is sought to improve the ergonomics of the image object presentation. Although an improvement of the ergonomics of the image object presentation can be achieved through this procedure, doubts exist as to whether necessarily subjective statements of individual users are relevant and representative for all users or user groups. In addition, follow-up statements that describe the user behavior of a collective of users (what are known as trends or patterns) are made only insufficiently on the basis of individual, highly subjective user surveys.

SUMMARY OF THE INVENTION

An object of the present invention is to provide a method for objective analysis of the user behavior of users of a digital image information system, with which method the aforementioned disadvantages can be avoided.

This object is achieved by a method according to the invention for evaluation of the user behavior of at least one user of a digital image information system during observation and/or assessment and/or processing of at least one image object by the user, the object being presented on at least one display device of a digital image information system.

As used herein the term "image object" means data representing a text portion containing administrative information and a pixel portion containing the pure image data, corresponding to the definition of this term in the DICOM standard. Such image objects can contain one image or a number of images (for example a sequence) that were generated by an imaging modality. Such image objects can additionally contain images that were respectively generated by a number of imaging modalities.

In the image information system of the present invention, the image archiving and storage system includes a long term data storage device for archiving pixel portions of image objects, a databank associated with the long term data storage device for storage of the text portions of the image objects, and a short term data storage device with which a faster access to image data is enabled. On the basis of an image object query in the image information system, which can be generated, for example, by an image workstation due to a manual interaction of a user or automatically, for example by an electronic data management device of the image information system, the queried image object can be read from the storage and be presented on at least one display device at the image workstation.

In accordance with the inventive method, at least one selectable indicator of the user behavior of one or more users of the digital image information system is registered by at least one detector (sensor) designed to register the selectable indicator of the user behavior during the viewing and/or assessment and/or processing of at least one image object shown or on the display device (graphical user interface) in the form of recording data. The at least one detector (sensor) for registering the at least one selectable indicator of the user behavior, is a component (or components) of the image information system. The detection of the selectable indicator of the user behavior during the viewing and/or assessment and/or processing of the image object shown on the display device is controlled by an electronic control and evaluation device of the digital image information system, this electronic control and evaluation device is suitable for data processing.

Furthermore, in accordance with the inventive method the data (recording data) of the at least one selectable indicator of the user behavior, which data are recorded by the aforementioned detector, are transferred to the electronic control and evaluation device, and a quantitative and/or qualitative evaluation of the recording data ensues that is related to the at least one image object that is presented (i.e. the data are correlated with the image object). A correlation of recording the data or results of the quantitative and/or qualitative analysis of recording data ensues in the control and evaluation device of the digital image information system.

A quantitative and/or qualitative evaluation of recording data representing at least one indicator of the user behavior is accordingly implemented that is related to (correlated with) at least one image object that is shown or on the at least one display device of the digital image information system. Inasmuch it is not necessary that an image object actually be presented on a display device of the digital image information system, but it is sufficient that an image object is able to be presented, such that recording data can, for example, also be related to a first image object to be presented on a display device.

In order to be able to establish a connection (correlation) between the recording data of the at least one user indicator and the at least one image object presented, or that can be presented, on the at least one display device of the digital image system, information about the image object (for example, which image object it is or how it is presented at specific points in time on a display device of the image information system, and thus can be viewed or processed by a user) is transferred to the control and evaluation device of the digital image information system. The transfer of such information about the image object (in relation to which image object the recording data of at least one user indicator should be set (correlated)) can ensue via a data management device (data management system) of the digital image information system. The transfer of such information can similarly be initiated by the control and evaluation device of the digital image information system. A correlation of the recording data or of the result of the quantitative and/or qualitative evaluation of the recording data with the at least one image object, ensues via the control and evaluation device of the digital image information system.

The invention allows at least one indicator of user behavior is quantitatively and/or qualitatively evaluated on the basis of objective recording data in relation to at least one image object presented at a display device, such that in particular the ergonomics of the graphical user interface (such as a specific manner of the image object presentation) can be adapted in an advantageous manner to the actual requirements of the user. In addition, (meta)conclusions in relation to the recording data of the inherent trends and patterns can be extracted from the recording data.

In an embodiment of the inventive method, a quantitative and/or qualitative evaluation of the recording data representing at least one indicator of a user behavior can be related to at least one workflow step of the user. All activities of the user that are required or are implemented for a process step to be considered as self-contained are included in such a workflow step. For example, the workflow step "prepare image viewing" thus includes the activities to be implemented, or implemented, by a user (such as computer mouse clicks and keyboard strikes) until an image object can be viewed on a display device; the workflow "image viewing" includes the activities (such as computer mouse clicks and keyboard strikes) in the viewing of an image object; and the workflow step "image assessment" includes the activities (such as computer mouse clicks and keyboard strikes) in the assessment of an image object. Information about the workflow steps can be transmitted, for example, to the control and evaluation device of the digital image information system via the data management device of the digital image information system. It is similarly possible for a transfer of information with regard to the workflow steps to be initiated by the control and evaluation device of the digital image information system. Furthermore, it is possible for information about the workflow steps to be interactively fed by a user into the digital image information system, and supplied to the control and evaluation device of the digital image information system. A connection (correlation) between the recording data or the result of the quantitative and/or qualitative evaluation of the recording data and the at least one workflow step is determined by the control and evaluation device of the digital image information system.

According to a further embodiment of the inventive method, the quantitative and/or qualitative evaluation of the recording data includes a quantitative statistical data analysis, for example a calculation of expected values and standard deviations (variances) of selectable statistical quantities.

In further embodiments of the inventive method, the quantitative and/or qualitative evaluation of the recording data includes an explorative data analysis with the goal of pattern or trend detection, known as "data mining".

According to a further embodiment of the inventive method, the quantitative and/or qualitative evaluation of the recording data includes at least one statistical hypothesis test.

For quantitative and/or qualitative evaluation of the recording data that represent at least one indicator of the user behavior, the quantitative statistical data analysis, the data mining and the at least one hypothesis test can be implemented individually or in arbitrary combinations with regard to at least one image object. A presentation of an evaluation result of the quantitative and/or qualitative evaluation of the recording data on at least one graphical display device advantageously ensues.

According to a further embodiment of the inventive method, one or more indicators are selected (individually or in arbitrary combinations) in a suitable manner from a group of indicators of the user behavior that includes biometric data of the user, interactions of the user with the graphical user interface, location data of a user, identification data of a user, and data contained on an electronic smart card of a user.

In a further embodiment of the inventive method, one or more detectors are selected (individually or in arbitrary combinations) in a suitable manner from a group of detectors for recording the at least one selectable indicator of the user behavior, this group including at least one digital image acquisition device (camera), at least one digital biometric recording device, a keyboard, a computer pointer input device (computer mouse), a reader for smart cards, a mobile telephone, and a PDA (personal digital assistant).

In another embodiment of the inventive method, using biometric recording data of a user (such as eye positions and pupil dilation of a user), which are registered via digital image acquisition devices, the viewing directions of said user is determined ("view tracking"), for example by a linear projection of the eye positions given the respective pupil dilations. A correlation between the viewing directions and an image object shown on at least one display device as well as a quantitative and/or qualitative evaluation of the determined viewing directions correlated with the image object subsequently ensues. This allows it to be precisely determined in which regions of an image object shown on a display device users glance most often.

The invention also encompasses an electronic control and evaluation device for controlling the quantitative recording of recording data with regard to at least one selectable indicator of user behavior of at least one user of a digital image information system, as well as for quantitative and/or qualitative evaluation of such recording data. The electronic control and evaluation device is provided (for example by storage in a non-volatile local memory of the control and evaluation device) with a computer-readable program code (data structure forming a computer program) that contains control commands that cause the electronic control and evaluation device to implement the inventive method described above.

Furthermore, the invention encompasses a computer-readable program code (data structure forming computer program) for such an electronic control and evaluation device, this program code containing control commands that cause the electronic control and evaluation device to implement the inventive method described above.

Moreover, the invention encompasses a storage medium (computer program product) with a computer-readable program code stored therein for such an electronic control and evaluation device, the program code containing control commands that cause the electronic control and evaluation device to implement the inventive method described above.

DESCRIPTION OF THE PREFERRED EMBODIMENTS

Figure 1:
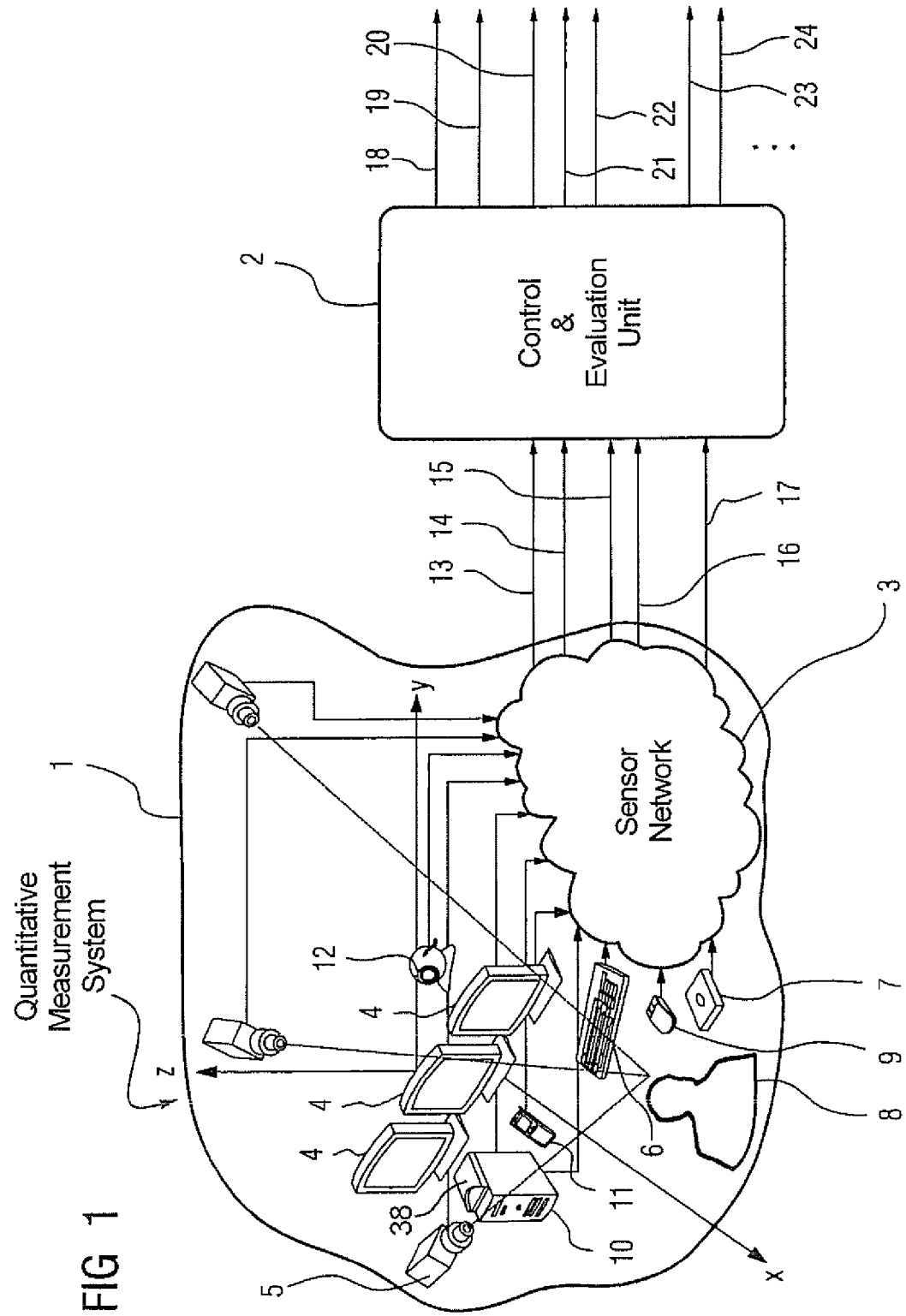
FIG. 1 shows, in a schematic representation, the design of an exemplary embodiment of the inventive image information system.

FIG. 1 illustrates the design of an exemplary embodiment of the inventive image information system (namely an integrated PACS/RIS image information system).

An integrated PACS/RIS image information system (or medical system architecture) as may typically be used, for example, in a radiological department of a clinic, has a quantitative measurement system (designated as a whole with the reference number 1) and a control and evaluation unit 2.

The quantitative measurement system 1 has a monitor workstation with a plurality of (for example three) display devices 4 for presentation of image objects stored in the digital image information system. Such image objects can be viewed and/or assessed and/or processed by a user 8 of the digital image information system, for example a radiologist and/or a medical-technical assistant.

Not shown in detail in FIG. 1 is a long term data storage device for archiving of image objects and a short term data storage device for storage of image objects which can be shown at the monitor workstation. The archiving and storage of image objects ensues via the PACS system of the image information system.

A number of detectors are provided for evaluation of at least one indicator of the user behavior of a user 8 in relation to the image object presented or that can be presented by the display devices 4, the recording data (sensor data) of the detectors being supplied to a sensor network 3, bundled by this network, and transferred to the control and evaluation device 2.

The detectors are, for example, a number (for example three) of digital video cameras 5 that are arranged such that they can record the user from various directions in order to track the positions (sites) of a user, as well as a digital web camera 12. The images are presented on a monitor in a typical manner.

A keyboard 6, with which the type and frequency of keyboard strikes of the user 8 can be detected, and a computer pointer input device 9 (computer mouse), with which the type and frequency of a pointer input of the user 8 can be detected, can also be provided as detectors.

In addition to these, for example, at least one biometric detection device 7 (such as, for example, a fingerprint sensor, an iris or pupil sensor, a face recognition sensor or a palm vein sensor) is provided with which selectable biometric data of the user 8 can be detected. The digital video cameras 5 and the digital web camera 12 can likewise be used for detection of biometric data of the user (such as eye position, viewing direction, pupil dilation), as was explained above.

For example, by the detection of eye positions and pupil dilations of a user and the viewing directions of a user that are derived from these, as well as by a correlation with an image object presented on a display device and/or a quantitative and/or qualitative evaluation of the viewing directions (towards the shown image object), it can be checked in an exact manner whether specific presentation formats of image objects are actually suitable for specific users or user groups. It can thus be analyzed which regions of shown image objects are viewed more frequently or less frequently by which users and under which circumstances, such that the presentation of image objects can be optimized in an advantageous manner.

For example, the degree of fatigue of a user can be established by detection of the pupil dilation, whereby a narrow pupil corresponds to a stronger degree of fatigue while a wider pupil corresponds to a lesser degree of fatigue, such that among other things it can be analyzed which presentation type of image objects leads to an optimally low fatigue of the user.

Furthermore, a reader 38 for electronic cards (known as smart cards) can be provided, from which information about the user (such as, for example, an access authorization to data sets, degree of qualification and the like) can be read. A hand-held communication unit 11, such as a mobile telephone, PDA (personal digital assistant) or the like can be used for recording updated user data.

Furthermore, a data processing device 10 (such as a workstation or a personal computer) is provided at the control and evaluation device, in particular for transmission of data with regard to the image object presented or that can be presented in the display devices 4. The data processing device can in particular be connected with a data management device of the digital image information system.

The transmission of sensor data to the sensor network 3 is presented in a symbolic manner in FIG. 1 by the arrows directed from the respective detector devices to the sensor network 3. All detected data are transferred to the control and evaluation device 2 via the sensor network 3.

As is symbolized by the arrows directed from the sensor network 3 to the control and evaluation device 2, user location data 13 (recorded, for example, by the digital cameras 5) which encode the location of the user 8; user identification data 14 recorded by the reader for electronic cards 25, which user identification data 14 identify the user 8; eye position and view tracking data 15 recorded by the digital cameras 5 and/or the web camera 12, which eye position and view tracking data 15 encode the eye positions and the viewing directions of the user 8; data 16 about the degree of fatigue that are derived from pupil dilations of a user detected by the digital cameras 5 and/or the web camera 12, which data 16 encode a degree of fatigue of the user 8 based on the pupil diameter; and what is known as a priori information 17 transmitted from the data processing device 10, which information 17 comprises information that is learned from the text portion (header) of the image object and can, for example, contain information about the patient such as name, birth date, patient number, type of the examination, study, modality name, etc., transferred to the control and evaluation device 2.

A quantitative and/or qualitative analysis of the supplied recording data; a correlation of the recording data in relation to at least one presented image object or one image object that can be presented; and a quantitative statistical data analysis and/or data mining and/or at least one hypothesis test in relation to the at least one presented image object or, respectively, one image object that can be presented ensues in the control and evaluation device 2 of the digital image information system.

As is symbolized by the arrows directed away from the control and evaluation device 2, an analysis of the recording data can ensue, for example, in the manner that a PACS/RIS usage statistic 18 (statistic about the usage of the image information system) is generated; a quantitative quality statistic 19 of the display devices 4 is generated; a quantitative workflow statistic 20 is generated; a trend/pattern recognition 21 of hidden trends ensues; a hypothesis test result 22 is output; metrics 23 are generated with regard to the ergonomics or simplicity of usage of the display devices 4 or navigation concepts; or marketing analyses 24 are generated.

A presentation of the evaluation results of the quantitative and/or qualitative evaluation of the recording data advantageously ensues in a display device that is connected with the control and evaluation device.

Figure 2:
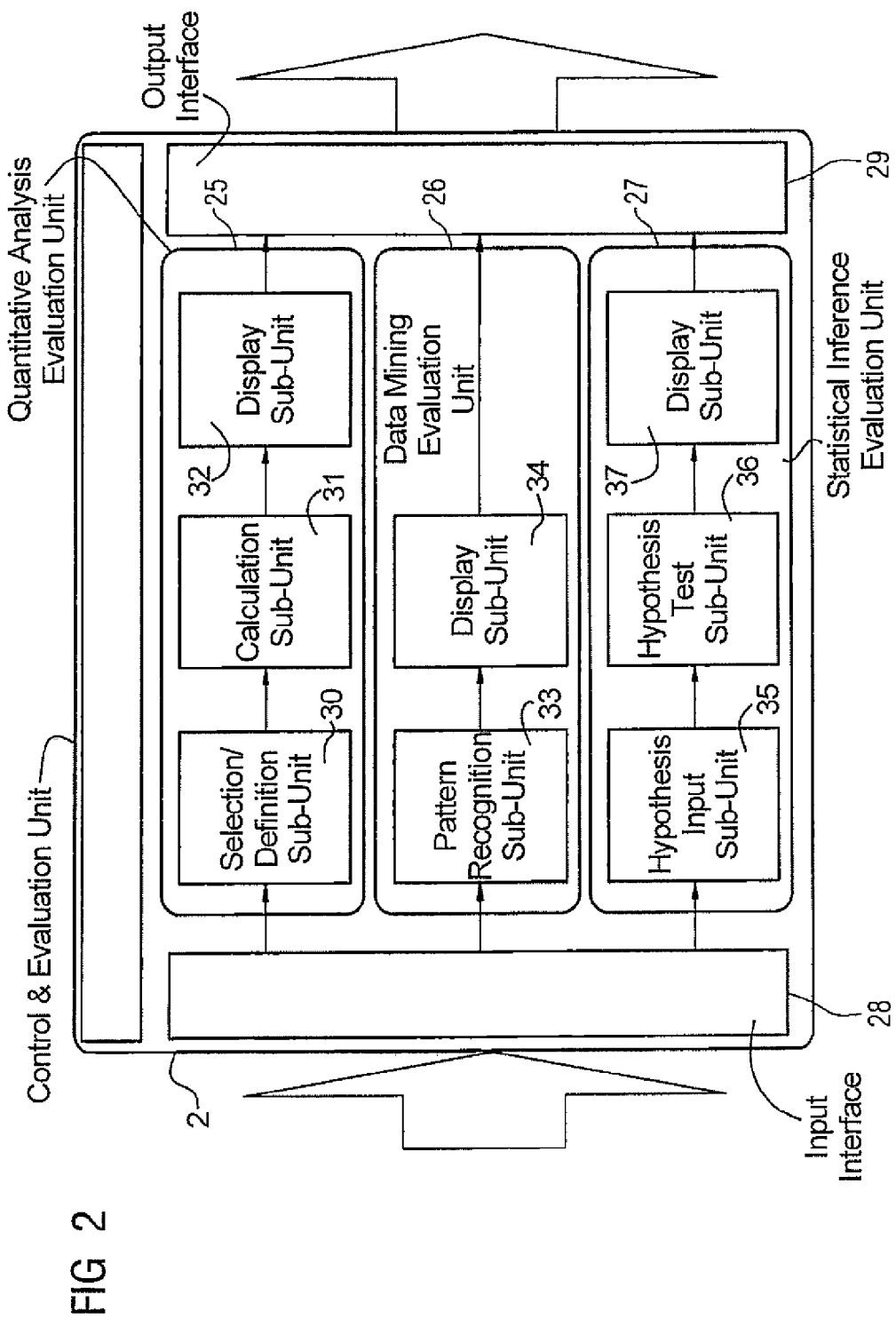
FIG. 2 shows in a schematic representation the design of an exemplary embodiment of the control and evaluation device of the inventive image information system from FIG. 1.

FIG. 2 shows the design of an exemplary embodiment of the control and evaluation device of the inventive image information system from FIG. 1, in a schematic representation.

The control and evaluation device 2 accordingly has three separate evaluation units, namely a quantitative analysis evaluation unit 25, a data mining evaluation unit 26 and a (Bayesian) statistical inference evaluation unit 27.

Sensor data from the sensor network 3 are supplied to the three evaluation units 25, 26, 27 via a common input interface 28. The evaluation results generated by the evaluation units are supplied to one or more display devices for their display via an output interface 29 common to the three evaluation units 25, 26, 27.

In the quantitative analysis evaluation unit 25 the sensor data supplied via the input interface 28 are initially supplied to a selection/definition sub-unit 30 in which at least one statistical value can be selected and/or defined, for example interactively by a user. A calculation sub-unit 31 is arranged downstream from the selection/definition sub-unit 30, in which calculation sub-unit 31 the statistical value or values selected or defined in the selection/definition sub-unit 30 are calculated on the basis of the supplied sensor data. A calculation result is subsequently supplied to a display sub-unit 32 which prepares the calculation result for a graphical presentation. The prepared calculation result is then transferred to at least one display device via the output interface 29.

This can be explained in detail in a concrete example: for example, the object of the quantitative analysis evaluation unit 25 should be to analyze the number of computer mouse clicks which are necessary on average for a radiologist to implement the workflow steps "prepare image viewing", "image viewing" and "image assessment" already explained further above.

In a first step, the suitable buttons and the suitable test pattern for this quantitative analysis are established, whereby the suitable buttons in this case are a pressed left, middle and/or right computer mouse button and the matching pattern in this case is the number of computer mouse clicks during the workflow steps "prepare image viewing", "image viewing" and "image assessment".

In a second step such statistical values are defined or selected from a predetermined list (all values, only mean, minimum and maximum values etc.) which should be displayed, as well as in which format (for example graphically or as a number) the statistical values should be displayed.

In a third step the quantitative analysis evaluation unit 25 calculates the desired results, whereby the statistical means of the number of the computer mouse clicks during the workflow steps "prepare image viewing", "image viewing" and "image assessment" as well as their variances are calculated, namely:

1) The statistical mean of the number of computer mouse clicks during the workflow step "prepare image viewing": E[Npir], wherein Npir is the random variable number of computer mouse clicks during the workflow step "prepare image viewing".

2) The statistical mean of the number of computer mouse clicks during the workflow step "image viewing": E[Nir], wherein Nir is the random variable number of computer mouse clicks during the workflow step "image viewing".

3) The statistical mean of the number of computer mouse clicks during the workflow step "assessment": E[Nr], wherein Nr is the random variable number of computer mouse clicks during the workflow step "assessment".

The variances of these three expected values result from:

$$\sigma_{2Npir} = E[(Npir - ENpir)^2],$$

$$\sigma_{2Nir} = E[(Nir - ENir)^2] \text{ and}$$

$$\sigma_{2Nr} = E[(Nr - ENr)^2].$$

For example, the result of an actual implemented analysis reads:

$$E[Npir] = 1.119 \text{ with } \sigma_{2Npir} = 0.515,$$

$$E[Nir] = 3.1 \text{ with } \rho_{2Npir} = 0.01,$$

$$E[Nr] = 3.4 \text{ with } \sigma_{2Nr} = 0.232.$$

The quantitative analysis evaluation unit 25 furthermore calculates the greatest deviation, meaning the minimal and maximal values of the mean values discovered in the analysis.

For example, in an actual implemented analysis it turned out that in 1 case from 1000 cases the maximum number of computer mouse clicks of the radiologist during the workflow step "prepare image viewing" was 10 and the minimal number of computer mouse clicks of the radiologist during the workflow step "prepare image viewing" was 1. Through a closer analysis it could be detected that the image orientation was for the most part less suitable, meaning that it did not correspond to a preferred viewing orientation of the radiologist, such that the radiologist had to rotate the images until they corresponded to his preference, which led as a result to more than 1 computer mouse click.

In the data mining evaluation unit 26 the sensor data supplied via the input interface 28 is initially supplied to a pattern recognition sub-unit 33 in which it is sought to detect a selectable (hidden) pattern or, respectively, trend in the recording data. A pattern recognition result is subsequently supplied to a display sub-unit 34 which prepares the pattern recognition result for a graphical presentation. The prepared pattern recognition result is then transferred via the output interface 29 to at least one display device.

This is explained in detail in an example:

Data mining should, for example, detect a hidden trend in the images requested by referring medical professionals of a radiology department. For example, the data mining evaluation unit 26 detects from the recording data that there was a significant increase in requested PET/CT examinations in a specific year compared with the preceding year. Based on this realization, the decision can be made by a clinic administration to acquire additional PET/CT scanners in order to meet the increased demand.

In the (Bayesian) statistical inference evaluation unit 27, the recording data supplied via the input interface 28 are initially supplied to a hypothesis input sub-unit 35 in which one or more statistical hypotheses to be checked are input or, respectively, can be defined (for example interactively by a user). A hypothesis test sub-unit 36 is arranged downstream from the hypothesis input sub-unit 35, in which hypothesis test sub-unit 36 the statistical hypotheses input into the hypothesis input sub-unit 35 are tested. A hypothesis test result is subsequently supplied to a display sub-unit 37 which prepares the calculation result for a graphical presentation. The prepared hypothesis test result is then transferred via the output interface 29 to at least one display device.

The statistical inference evaluation unit 27 checks the statistical hypothesis to be tested using the Bayesian rule. This is achieved by deducing the probability that a hypothesis is true. Bayesian inference utilizes a numerical estimation of the probability of the applicability of the hypothesis after evidence has been observed.

This can be explained in two examples:

Example 1

The following statistical hypothesis should be tested on the basis of the recording data: is there evidence that a treatment with a medicine XX leads to a significantly faster healing than with a medicine YY?
Answer: yes, in 70% of all cases.

Example 2

The following statistical hypothesis should be tested on the basis of the recording data: the medical error rate increases with the fatigue of the radiologist.

Answer: this hypothesis is true in 90% of all cases, whereby 10,000 cases were checked by the hypothesis evaluation unit 27.

Not shown in Figures is a further evaluation unit which results from a combination of the data mining evaluation unit 26 and the (Bayesian) statistical inference evaluation unit 27, namely a usability/marketing evaluation unit which automatically conducts analyses of the usability and of marketing aspects of the digital image information system.

In addition to a pure optimization of the graphical user interface, a model of the image interpretation process can also be generated and validated by the user with the inventive method. Responses to the following questions can in particular be found by means of the inventive method: which information is decisive for a clinical user in order to find a specific diagnostic? How long does it typically take until the finding is written and signed? How does this change due to the use of specific IT technologies, such as (for example) gamepads, 3D post-processing, CAD and the like? How is the medical precision influenced by specific innovations? Which workflow steps are workflow steps common to the cases during the image viewing and which are exceptional cases? At which level is the image viewing process more or less the same? At which level is the image viewing process different compared to the reason for the examination? On which factors does the image viewing process depend or, in other words, on which factors does the image viewing strategy of a specific user (examination reason, specialty field of the observing medical professional etc.) depend? Which information does the medical professional wish to have delivered from the image information system before the image viewing, and how should this information be presented? What influence does a custom-tailored system have on the efficiency of a medical professional and how much faster does this hereby make him?

An improved efficiency and a reduced user load in the image viewing, assessment and processing can be achieved with the inventive method, in particular through clarification of the above questions. It can be achieved that a user implements fewer eye movements and uses less viewing time on display device regions in which no image is shown, implements fewer keyboard strikes and computer mouse inputs, requires less time for assessment of an examination and shows less fatigue after a longer time span of the viewing of image objects.

The inventive method can be used in digital image information systems outside of the medical application field, for example in scientific fields such as viewing meteorological or astronomical images.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for evaluating user behavior of a user of a digital image information system during at least one activity selected from the group consisting of viewing, assessing and processing, at least one image object presented on at least one display device with which the user interacts, said method comprising the steps of:

selecting and automatically controlling detection of at least one indicator of said user behavior in an environment of said at least one display device during said activity, to obtain recording data representing said at least one indicator selected from the group of indicators consisting of biometric data of the user, user identification data, and data stored on a smart card associated with the user;

transferring said recording data from said environment to an electronic evaluation device;

automatically making a quantitative evaluation of said recording data in said electronic evaluation device with regard to said at least one image object presented on said at least one display device during said activity, to obtain a calculation result; and visually presenting a graphical presentation of said calculation result.

2. A method as claimed in claim 1 comprising, in said electronic evaluation device, subjecting said recording data to a quantitative statistical data analysis.

3. A method as claimed in claim 1 comprising, in said evaluation device, conducting said quantitative evaluation as a data mining evaluation by analyzing said recording data to identify a pattern or trend therein.

4. A method as claimed in claim 1 comprising, in said electronic evaluation device, making said at least one of said quantitative evaluation or said qualitative evaluation by subjecting said recording data to at least one statistical hypothesis test.

5. A method as claimed in claim 1 comprising, in said electronic evaluation device, making said quantitative evaluation by relating said recording data to at least one workflow step performed by said user during said activity.

6. A method as claimed in claim 1 comprising detecting said at least one indicator with at least one detector selected from the group consisting of a digital image acquisition device, a digital biometric recording device, a computer keyboard, a computer pointer input device, a smart card reader, a mobile telephone, and a PDA.

7. A method as claimed in claim 1 wherein the step of detecting said at least one indicator comprises detecting biometric data of the user during said activity, and comprising, in said electronic evaluation device, making said quantitative by identifying viewing directions of the user relative to said at least one display device from said biometric data, correlating said viewing directions with the image object presented on said at least one display device during said activity, and making a quantitative evaluation of said viewing directions correlated with said image object.

8. A digital information system comprising:

at least one display device at which an image object is presented with which the user interacts by performing at least one activity selected from the group consisting of viewing, assessing and processing;

at least one detector that detects an indicator of said user behavior in an environment of said at least one display device during said activity, to obtain recording data representing said at least one indicator;

a control and evaluation device configured to automatically select and control said at least one detector to obtain said recording data to represent at least one indicator selected from the group of indicators consisting of biometric data of the user, user identification data, and data stored on a smart card associated with the user, said recording data being transferred from said environment to said control and evaluation device;

said control and evaluation device being configured to automatically make a quantitative evaluation of said recording data with regard to said image object presented on said at least one display device during said activity, to obtain a calculation result; and said control and evaluation device comprising a display at which a graphical presentation of said calculation result is visually presented.

9. A digital information system as claimed in claim 8 wherein said control and evaluation device is configured to subject said recording data to a quantitative statistical data analysis.

10. A digital information system as claimed in claim 8 wherein said control and evaluation device is configured to conduct said quantitative evaluation as a data mining evaluation by analyzing said recording data to identify a pattern or trend therein.

11. A digital information system as claimed in claim 8 wherein said control and electronic evaluation device is configured to make said quantitative evaluation by subjecting said recording data to at least one statistical hypothesis test.

12. A digital information system as claimed in claim 8 wherein said control and evaluation device is configured to make said quantitative evaluation by relating said recording data to at least one workflow step performed by said user during said activity.

13. A digital information system as claimed in claim 8 wherein said at least one detector is a detector selected from the group consisting of a digital image acquisition device, a digital biometric recording device, a computer keyboard, a computer pointer input device, a smart card reader, a mobile telephone, and a PDA.

14. A non-transitory computer-readable storage medium encoded with a data structure for evaluating user behavior of a user of a digital image information system during at least one activity selected from the group consisting of viewing, assessing and processing, at least one image object presented on at least one display device with which the user interacts, said digital information system including a computerized control and evaluation device in which said medium is loaded, and said data structure causing said control and evaluation device to:

select and automatically control detection of at least one indicator of said user behavior in an environment of said at least one display device during said activity, said indicator being selected from the group of indicators consisting of biometric data of the user, user identification data, and data stored on a smart card associated with the user to obtain recording data representing said at least one indicator;

transfer said recording data from said environment to the electronic evaluation device;

automatically make a quantitative evaluation of said recording data in said electronic evaluation device with regard to said at least one image object presented on said at least one display device during said activity, to obtain a calculation result; and visually present a graphical presentation of said calculation result at said at least one display device.

* * * * *